United States Patent [19]

Gronenberg et al.

[11] Patent Number: 5,195,492

[45] Date of Patent: Mar. 23, 1993

[54] METHOD AND DEVICE FOR THE CONTROL OF A SOLENOID-VALVE-CONTROLLED FUEL-METERING SYSTEM

[75] Inventors: Roland Gronenberg; Joachim Tauscher, both of Stuttgart, Fed. Rep. of Germany

[73] Assignee: Robert Bosch GmbH, Stuttgart, Fed. Rep. of Germany

[21] Appl. No.: 894,003

[22] Filed: Jun. 3, 1992

[30] Foreign Application Priority Data

Jun. 21, 1991 [DE] Fed. Rep. of Germany ....... 4120463

[51] Int. Cl.[5] .............................................. E02M 37/04
[52] U.S. Cl. ...................................... 123/506; 123/500
[58] Field of Search ............... 123/500, 501, 458, 506, 123/436, 419

[56] References Cited

U.S. PATENT DOCUMENTS

| | | | |
|---|---|---|---|
| 4,104,990 | 8/1978 | Frobenius | 123/436 |
| 4,180,037 | 12/1979 | Hobo et al. | 123/506 |
| 4,216,752 | 8/1980 | Galan | 123/506 |
| 4,357,662 | 11/1982 | Schira et al. | 123/436 |
| 4,395,987 | 8/1983 | Kobayashi et al. | 123/506 |
| 4,489,698 | 12/1984 | Hofer et al. | 123/506 |
| 4,509,487 | 4/1985 | Mowbray | 123/458 |
| 4,527,531 | 7/1985 | Koyanagi et al. | 123/501 |
| 4,653,454 | 3/1987 | Konishi et al. | 123/506 |
| 4,757,795 | 6/1988 | Kelly | 123/501 |
| 4,777,921 | 10/1988 | Miyaki et al. | 123/506 |
| 4,779,595 | 10/1988 | Fujimori | 123/436 |
| 4,788,960 | 12/1988 | Oshizawa | 123/506 |
| 4,831,988 | 5/1989 | Hoefken | 123/506 |
| 4,936,217 | 6/1990 | Deutsch et al. | 123/436 |
| 4,969,600 | 11/1990 | Nicol | 123/506 |
| 5,105,788 | 4/1992 | Engel | 123/436 |
| 5,113,830 | 5/1992 | Haines | 123/506 |

FOREIGN PATENT DOCUMENTS 4004110  8/1991  Fed. Rep. of Germany .

*Primary Examiner*—E. Rollins Cross
*Assistant Examiner*—Thomas N. Moulis
*Attorney, Agent, or Firm*—Kenyon & Kenyon

[57] ABSTRACT

A method and device for the control of a solenoid-valve-controlled fuel-metering system for a diesel gasoline engine provide that the beginning and/or the end of the fuel metering are able to be controlled by trigger instants for the solenoid valve. An angular size is converted into a time quantity by applying at least one rotational-speed value. At least one first time quantity is calculated based upon a first rotational-speed value, and a second time quantity is calculated based upon a second rotational-speed value. A weighted time quantity is determined by generating a mean value from at least the first and second time quantities.

12 Claims, 4 Drawing Sheets

METHOD AND DEVICE FOR THE CONTROL OF A SOLENOID-VALVE-CONTROLLED FUEL-METERING SYSTEM

FIELD OF THE INVENTION

The present invention relates to a method and device for the control of a solenoid-valve-controlled fuel-metering system in which the beginning and end of a flow of fuel is controlled by trigger instants.

BACKGROUND OF THE INVENTION

German Published Patent Application No. 40 04 110, which is not prior art with respect to the present application, discloses a method and a device for controlling a diesel or gasoline engine using a solenoid-valve-controlled fuel-metering system. The fuel pump comprises a pump piston, which is driven by the camshaft and which pressurizes the fuel and delivers it into the individual cylinders. The beginning and end of fuel delivery are established by means of at least one solenoid valve. For this purpose, a control unit calculates trigger instants for the solenoid valve dependent upon markings located on a shaft.

In such systems, the problem arises that the control unit emits a trigger signal in the form of a time quantity. The exact beginning of injection must take place at a particular crankshaft (angular) position. The specific angle from the time of the beginning of injection. For this reason, time quantities must be converted into angular sizes, and angular sizes into time quantities, by applying a rotational-speed value.

Furthermore, a method and device for controlling a solenoid-valve-controlled fuel pump are known from German Published Patent Application No. 40 04 107, which is also not prior art with respect to the present application. On the basis of the desired beginning of the delivery of fuel and the desired duration of the delivery, an electronic controlling system calculates the trigger instant and the shut-off instant for one or more solenoid valves. This calculation determines the switching times of the solenoid valves.

In the prior art, to determine the instantaneous rotational speed, the increment is evaluated before the trigger instants are calculated. The idea behind this procedure is that it is always the most current, instantaneous rotational speed that is relied upon in order to convert an angular size into a time quantity. Since the so-called starting increment for the time extrapolation must be exchanged depending upon the desired beginning of fuel delivery, the determined rotational-speed differential between two adjacent increments, between which the exchange is made, must not exceed a particular quantity. Since, however, the rotational speed fluctuates greatly from increment to increment, the result is that the injected fuel quantity is also subject to considerable fluctuations, causing poor running performance for the internal combustion engine.

Therefore, the object of the present invention is to improve the running performance of the internal combustion engine, and to minimize the fluctuations in the fuel metering.

SUMMARY OF THE INVENTION

The present invention provides a method and device for controlling a solenoid-valve-controlled fuel-metering system for an internal combustion engine. A first time value is determined based upon a first rotational speed, and a second time value is determined based upon a second rotational speed. A weighted time value is determined from a weighted mean value which is based on the first and second time values.

The method and device according to the present invention have the advantage that no fluctuation occurs in the fuel quantity to be delivered.

DETAILED DESCRIPTION OF THE INVENTION

Figure 1:
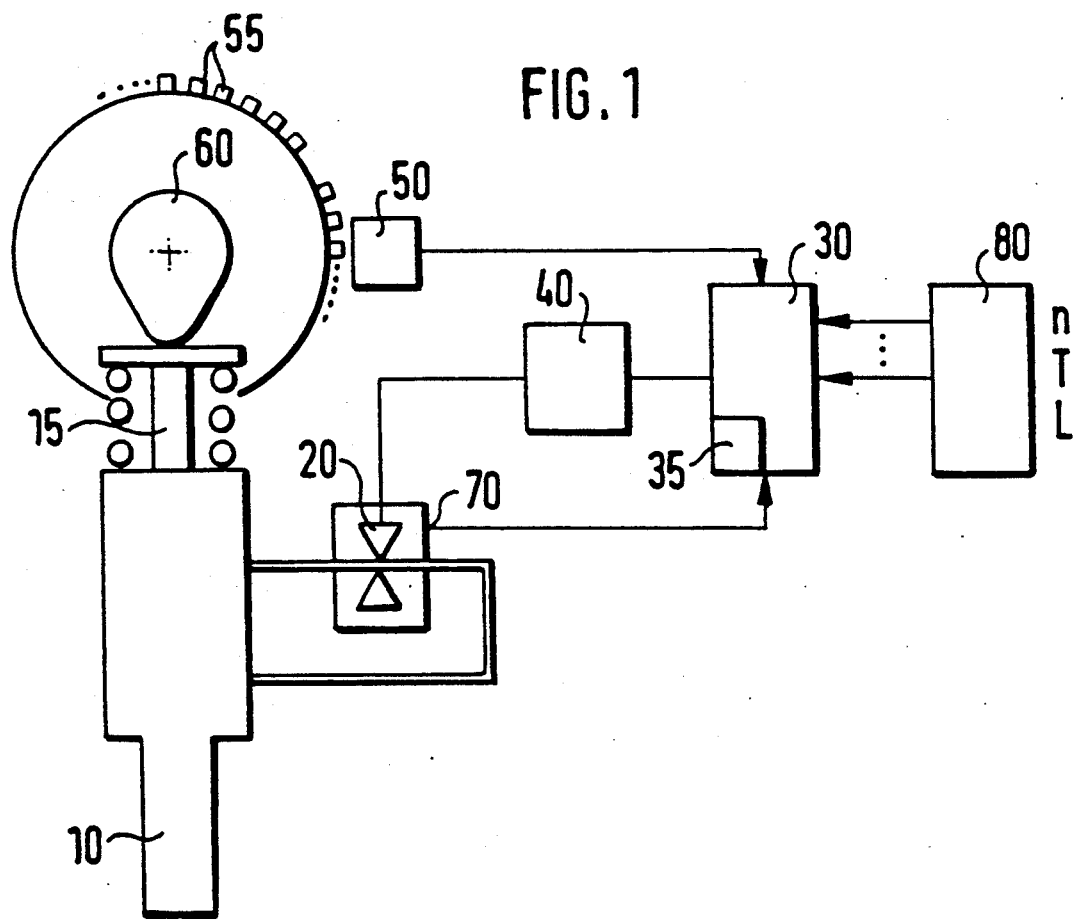
FIG. 1 shows a block diagram of the control system according to the present invention.

FIG. 1 shows the control system for solenoid-valve-controlled fuel pumps for diesel engines. Fuel is supplied to the individual cylinders of an internal combustion engine (not shown) via a fuel pump 10 containing a pump piston 15. A single fuel pump 10 can be assigned to each cylinder (pump-nozzle system), or a fuel pump (distribution pump) distributes the fuel to the individual cylinders on an alternate basis.

The fuel pump 10 is connected to an electromagnetic valve 20. The valve 20 receives switching pulses via a power output stage 40 from an electronic control unit 30 comprising a read-only memory 35. A transmitter 70, which is located on the electromagnetic valve 20 or on an injection nozzle (not shown), supplies signals to the electronic control unit 30.

Angular marks are located on an incremental gear 55 mounted on the camshaft 60. Every two marks define an increment. The incremental gear has at least one increment gap. An increment gap can be implemented, for example, by a missing tooth or by other appropriate techniques. A measuring device 50 detects the pulses from the angular marks, and, thus, the rotational motion of the increment gear 55. The measuring device supplies corresponding signals in the form of pulses to the electronic control unit 30. Sensors 80 provide information about additional parameters, such as the average rotational speed n, the temperature T or the load L (gas-pedal position), to the electronic control unit 30.

The average rotational speed n is detected over a greater angular dimension. Preferably, a transmitter is provided, which emits only a small number of pulses in the course of one rotation of the crankshaft or the camshaft. Preferably, one to four pulses are evaluated per rotation. These pulses are then measured and evaluated to determine the average rotational speed n. Preferably, the evaluation of the rotational speed allows the rotational speed to be averaged during an engine cycle or a combustion process.

Dependent upon the parameters detected by means of the sensors 80 and the rotational motion of the pump drive shaft 60 detected by the measuring device 50, the control unit 30 determines the desired beginning of delivery WB and the duration of delivery WD of fuel from the fuel pump 10. On the basis of these determined values for the beginning of delivery WB and the delivery duration WD, the control unit then calculates the trigger instants A and E for the power output stage 40.

One or more of the rotational speed, air temperature, lambda (λ) value, fuel temperature, other temperature values, the position of the gas pedal, and the desired traveling speed can be used as operating parameters. In place of the rotational motion of the pump drive shaft, the rotational motion of the camshaft and/or the crankshaft can be evaluated instead.

The measuring device 50 detects a signal, which indicates the position of the pump drive shaft. Among others, an induction transducer, an eddy-current detector, or another detector that measures the position of the pump drive shaft can be used as a measuring device 50.

The camshaft of the internal combustion engine, or a shaft coupled to it, acts as a pump drive shaft. The pump drive shaft drives the pump piston 15 which causes the fuel in the fuel pump 10 to be pressurized. The electromagnetic valve 20 controls the pressure build-up. Preferably, the electromagnetic valve is configured in such a way that no significant pressure build-up takes place when the valve is open. A pressure builds up in the fuel pump only when the electromagnetic valve 20 is closed.

At an appropriate pressure in the fuel pump, a valve (not shown) opens and, via the injection nozzle (not shown), the fuel reaches the combustion chamber of the internal combustion engine. The transmitter 70 serves to control at which instant the solenoid valve opens or closes. The transmitter 70 can also be installed on the injection nozzle. The transmitter then generates a signal which represents the actual beginning or end of the injection of fuel into the combustion chamber. In place of the output signal from the transmitter 70, a signal which indicates the position in which the solenoid valve is situated can instead be used. Such a signal is obtained by evaluating the current flowing through the solenoid valve or the voltage being applied to the solenoid valve.

Figure 2:
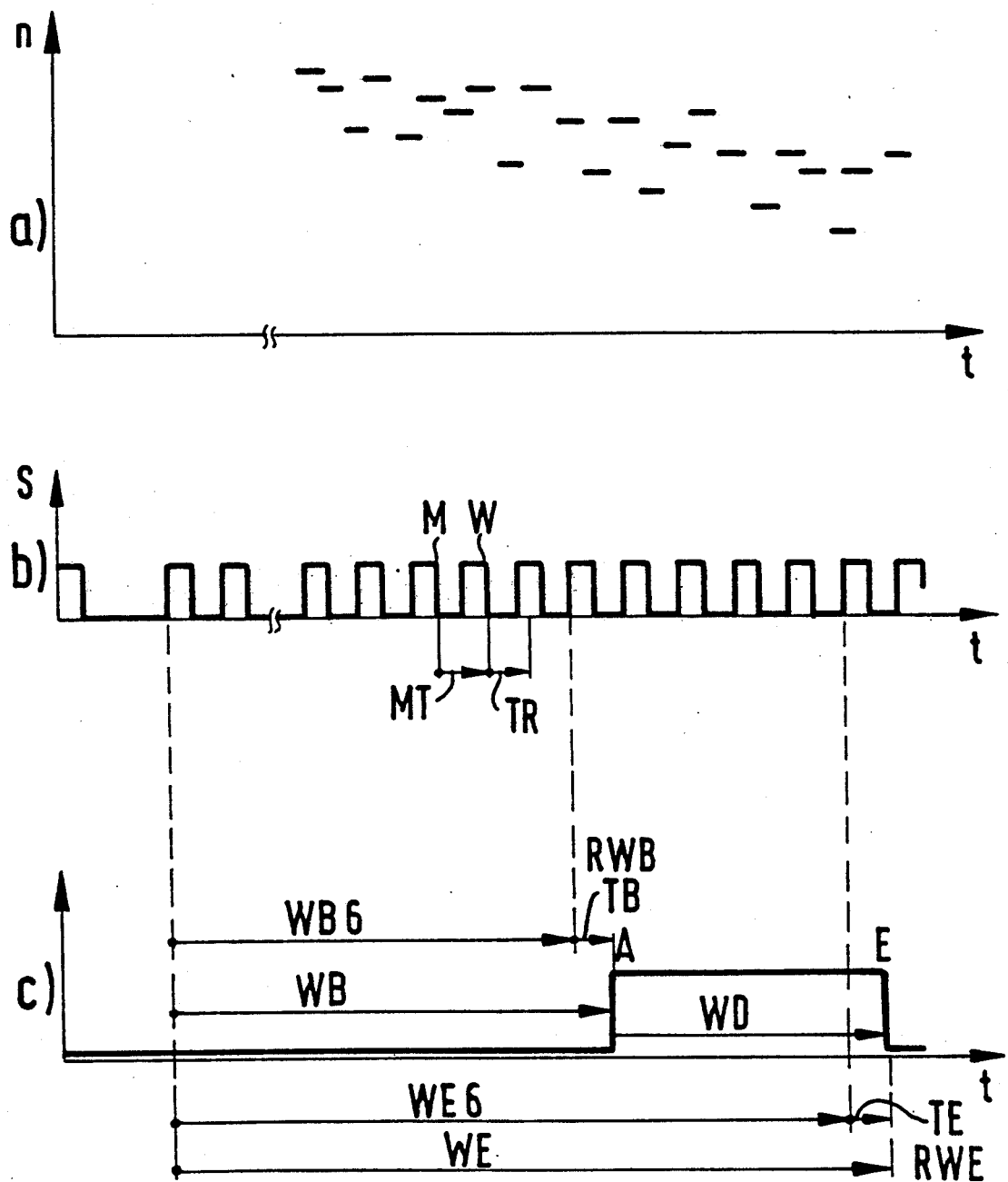
FIG. 2 shows various parameters during the fuel metering.

FIG. 2 illustrates the conversion of the angular sizes into the time quantities. FIG. 2a shows an ordinary series of rotational speeds during a metering-in process. The rotational speed values fluctuate greatly from increment to increment. Within the course of the metering-in process, the rotational speed decreases over time. FIG. 2b plots the pulses detected by the measuring device 50 from the increment gear 55. Each angular mark on the increment gear generates a pulse in the measuring device 50. Two pulses define one increment. It is particularly advantageous when the distance between two angular marks (an increment) is smaller than the smallest possible delivery angle WD. An increment angle of three degrees is particularly advantageous.

The various signals which determine the injection are plotted in FIG. 2c. The metered fuel quantity depends upon the duration-of-delivery angle WD, which is also referred to as the delivery angle and which is defined by the beginning WB of the metering, also referred to as the beginning of delivery, and the end WE of the metering, also referred to as the end of delivery.

At the trigger instant A, the solenoid valve 20 receives a signal that causes it to close, thus beginning the fuel metering. At the trigger instant E, the signal that acts on the solenoid valve 20 is canceled. This causes the solenoid valve to open, and the fuel metering to end.

To precisely determine the trigger instants A and E, the angles WB and WE are divided into integral angular components WBG and WEG, respectively, as well as into residual angles RWB and RWE, respectively, or instead into time components TB and TE, respectively.

The conversion of the angular sizes RWB and RWE into the time quantities TB and TE, respectively, takes place by means of the instantaneous rotational speed N. The time quantity T at the moment of interest is obtained from the angular size RW and the instantaneous rotational speed N based on the following expression:

$$T = RW/(6*N) \tag{1}$$

The rotational-speed value N for extrapolating the time components TB and TE is determined within a measuring angle MW which lies as close in front of the specific extrapolation segment as possible.

Figure 3:
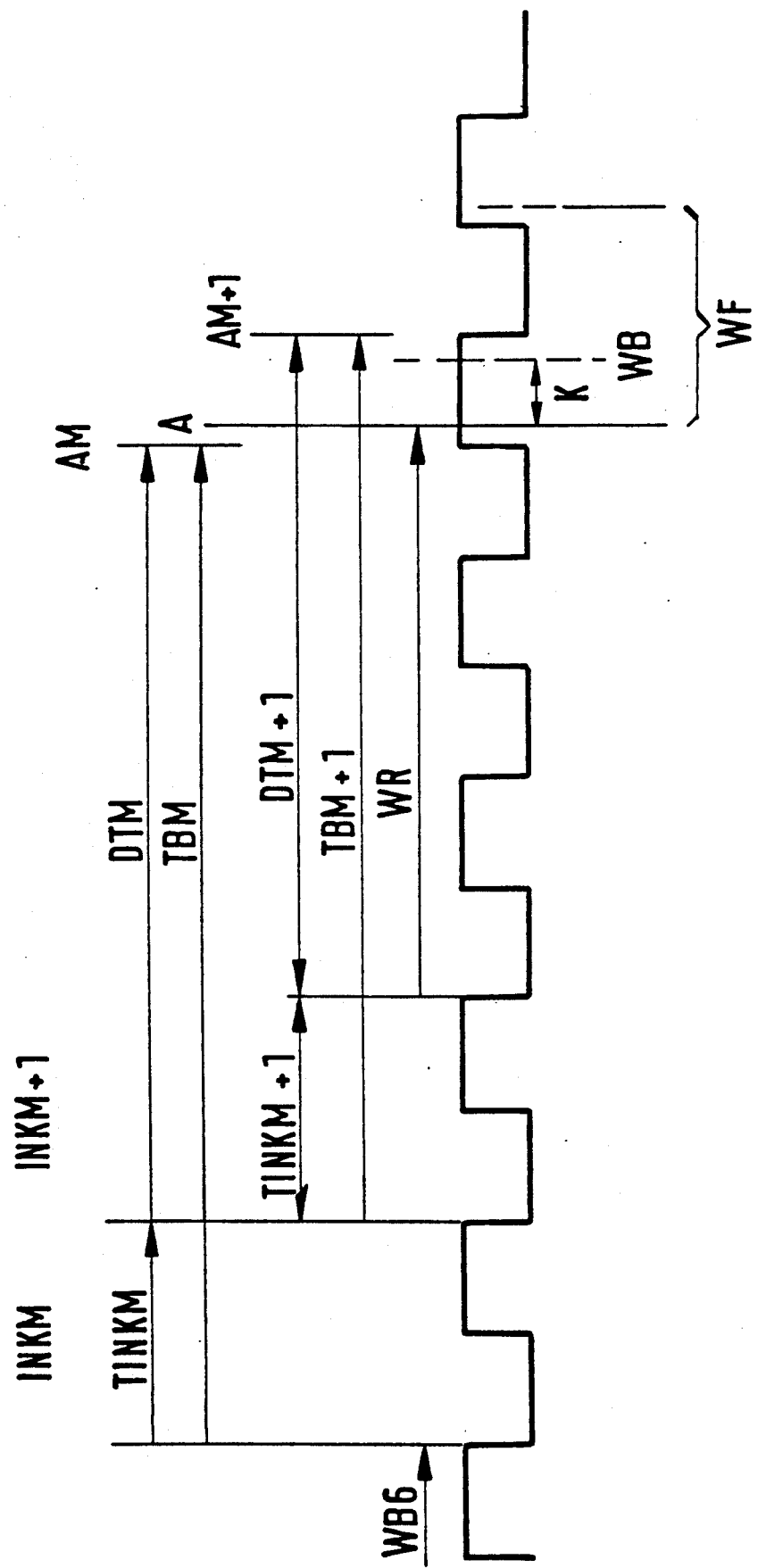
FIG. 3 shows the signals applied when calculating the trigger instants.

The calculation of the trigger instant A is shown in greater detail in FIG. 3. Only the trigger instant A establishes the beginning of delivery WB, which is explained in more detail below. Determination of the trigger instant E, which is also referred to as the shut-off instant and which establishes the end of delivery WE, is analogous.

The output signal from the measuring device 50, which detects the pulses from the incremental gear 55, is plotted over time. Each two successive corresponding edges of the signal define a single increment. In this embodiment of the present invention, each negative edge defines an increment. On the other hand, each two successive positive edges can define an increment. It is also conceivable that, in the case of a symmetrical high-low signal, two negative-sequence edges define an increment. In this manner, the increment width can be divided in half, given the same number of teeth.

The duration of one increment INKM is referred to as the incremental time TINKM. Similarly, the duration of one increment INKM+1 is referred to as the incremental time TINKM+1. The incremental time is defined as the time interval between two successive, single-phase edges. The reciprocal value of the incremental time is a measure of the instantaneous rotational speed in the particular increment.

As described with reference to FIG. 2, the integral angular component WBG is counted in angular increments up until the beginning of the increment INKM. The time component TBM is composed of the incremental time TINKM and the residual time DTM. This residual time DTM is calculated on the basis of the rotational speed in the increment INKM. A corresponding calculation is also performed with respect to the increment INKM+1. The trigger instant A is then determined from the two time components TBM and TBM+1 by means of a weighted mean value generation.

Starting from the second increment INKM+1, an angular window is defined in the interval of the computing-time angle WR. The angular window is an angle which begins after the increment INKM+1 by the amount of the computing-time angle WR, and preferably has the width of one increment (3°). The left edge of the angular window lies after the end of the second increment by the amount of the computing-time angle WR. If the desired beginning of delivery WB lies within this angular window, the calculation of the residual times immediately follows these two increments. If the angle WB lies outside of the angular window, the increments must be reselected.

The computing-time angle WR depends upon the approximately constant computing time and the average rotational speed n. The angle is larger at higher rotational speeds than at lower rotational speeds.

A first time quantity AM, also referred to as a first trigger instant, starts from the first increment INKM. A second time quantity AM+1, also referred to as a second trigger instant, starts from the second increment INKM+1. Preferably, the trigger instants AM and AM+1 of the solenoid valve are calculated according to the following expressions:

$$AM = TINKM + DTM \tag{2}$$

$$AM+1 = TINKM+1 + DTM+1 \tag{3}$$

where TINKM represents the duration of the increment INKM and DTM represents the residual time. The residual times DTM and DTM+1 are calculated according to the following expressions:

$$DTM = 1/(6*NM)*(WR+K+3°) \tag{4}$$

$$DTM+1 = 1/(6*NM+1)*(WR+K) \tag{5}$$

The first rotational-speed value NM is the instantaneous rotational speed detected in the first increment INKM, and the second rotational-speed value NM+1 is the instantaneous rotational speed detected in the second increment INKM+1. WR denotes the computing-time angle. Preferably, 3° is the incremental width, and defines the right edge of the measuring window. The weighing angle K describes the interval between the left edge, or the beginning of the angular window, and the desired beginning of delivery WB. The left edge of the angular window corresponds to the end of the computing-time angle WR.

Preferably, the first and second increments are two successive increments situated directly before the calculation of the trigger instants.

Since both the incremental time TINKM and the rotational speed NM depend upon the rotational speed in the increment INKM, different trigger instants AM result dependent upon the instantaneous rotational speed in the increment INKM. This, in turn, results in differences in the quantity of fuel injected, and thus an irregular running of the internal combustion engine. By weighing the instantaneous rotational speed, the influence of the differences in the rotational-speed values on the calculation of the residual times DTM can be compensated for. In general, however, this does not suffice, since the incremental times TINKM, TINKM+1 are also subjected to corresponding dispersions.

Therefore, calculation of the trigger instant follows based upon at least two successive increments. Subsequent to the calculation of the two trigger instants AM and AM+1, the calculation of a weighted time quantity A follows, preferably according to the following expression:

$$A = TINKM + DTM + K/3°*(AM+1-AM) \tag{6}$$

This formula corresponds to the following expression:

$$A = [(1/3°)*AM+1] + [(1-K/3°)*AM] \tag{7}$$

where A refers to the weighted time quantity, AM+1 the second time quantity, AM the first time quantity, K the size of the weighing angle, and 3° the incremental width.

This weighted mean-value generation depends upon the position of the beginning-of-delivery angle WB in the angular window. If the beginning-of-delivery angle WB lies to the left boundary of the angular window, K has the value zero, and thus the calculation of the trigger instant follows essentially based upon the first increment (INKM). In this case, the trigger instant A corresponds to the trigger instant AM, which is calculated based upon the increment INKM.

If the beginning-of-delivery angle WB lies to the right boundary of the angular window, K assumes a value of 3°, and thus the calculation of the trigger instant follows essentially based upon the second increment (INKM+1). In this case, the trigger instant A corresponds to the trigger instant AM+1 calculated based upon the increment INKM+1.

The method according to the present invention is not limited to the application of two increments. Trigger instants A1, A2, ..., AL can also be calculated based upon more than two increments, and a weighted mean-value generation can be performed based upon these trigger instants. As a result, the computing time is possibly prolonged. The trigger instant A is calculated based upon the following expression:

$$A = F1*A1 + F2*A2 + \ldots + FL*AL \tag{8}$$

where F1, F2, ..., FL represent the weighing factors. These weighing factors are selected so that their sum is equal to the value one. A1, A2, ..., AL represent the trigger instants calculated based upon various increments. A particularly advantageous embodiment of the present invention provides for the trigger instant A to be continuously calculated for each increment.

Figure 4:
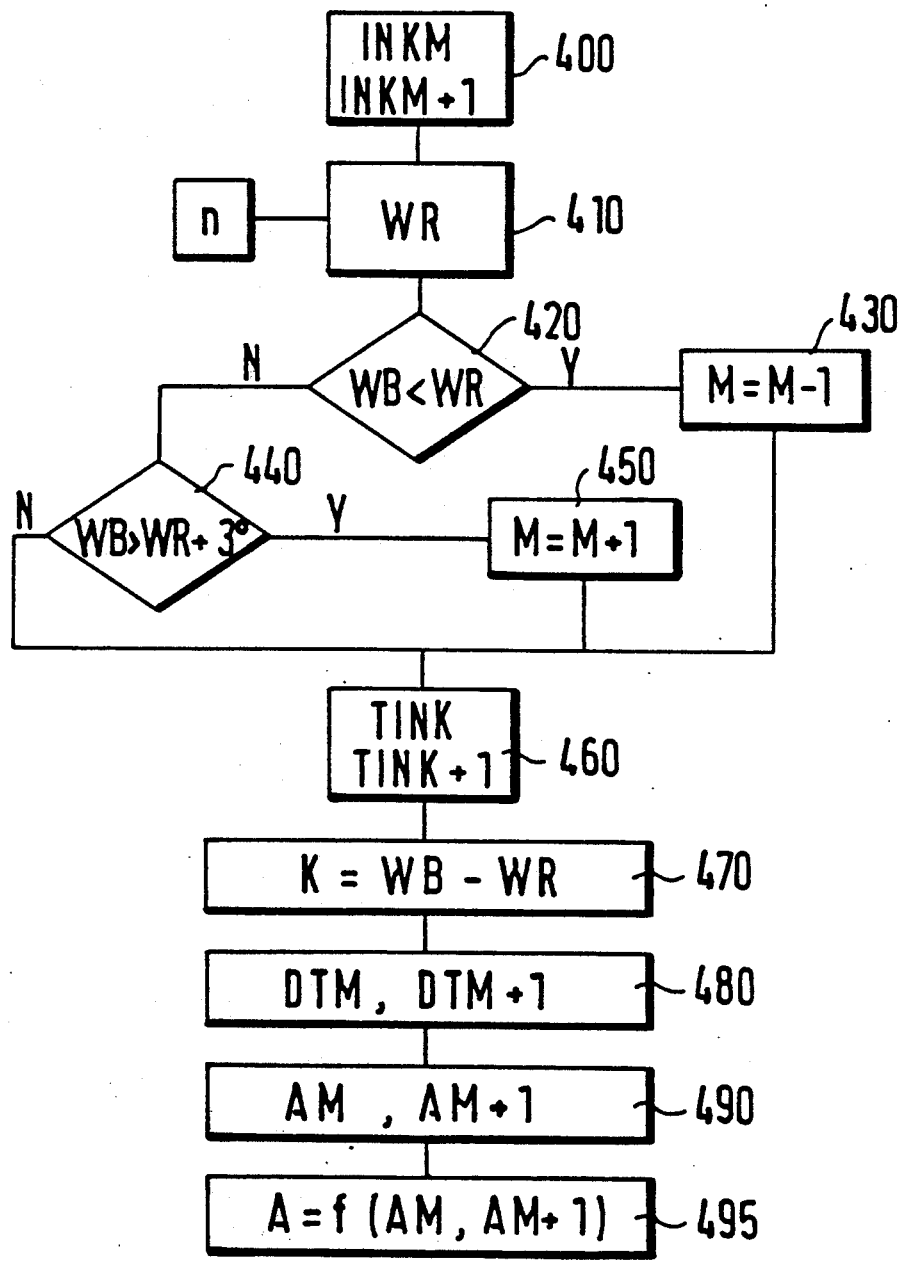
FIG. 4 shows a flow chart to illustrate the residual-time calculation.

Referring to FIG. 4, the method according to the present invention will be described with reference to the flow chart. Two start increments INKM and INKM+1 are selected in a first step 400. The trigger instants AM and AM+1 are subsequently extrapolated based upon these start increments. In step 410, the computing-time angle WR is determined based upon the average rotational speed n. If in step 420, it is recognized that the beginning-of-delivery angle WB is less than the computing-time angle WR, the increments INKM and INKM+1 are moved by one increment to an earlier time, i.e., the incremental counter M is decreased by one in step 430.

If it is recognized in step 420 that the angle WB is greater than the computing-time angle WR, step 440 follows. If in step 440, it is recognized that the angle WB is greater than the computing-time angle WR+3°, the starting increment is moved by one increment to a later time, in that the increment counter M is increased by one in step 450. Subsequently, in step 460 the incremental times TINKM and TINKM+1 are detected. In step 470, the calculation of the distance K between the angle WB and the end of the computing-time angle WR takes place. In step 480, the calculation of the remaining times DT1 and DT2 then takes place according to the above-mentioned expressions.

In step 490 the trigger instants AM and AM+1 are then determined from the sum of the respective incremental times INKM and INKM+1 and the corresponding residual times DTM and DTM+1. The weighted mean value determination then takes place in step 495. The weighted mean value determination based upon the trigger instants AM and AM+1 then results in the actual trigger instant A.

The terms and expressions which are employed herein are used as terms of expression and not of limitation. And, there is no intention, in the use of such terms and expressions, of excluding the equivalents of the features shown, and described, or portions thereof, it being recognized that various modifications are possible within the scope of the invention.

What is claimed is:

1. A method of controlling a solenoid-valve-controlled fuel-metering system for an internal combustion engine, comprising the steps of:
   measuring a first rotational speed of the engine at a first predetermined time increment;
   determining a first time value based upon the first rotational speed;
   measuring a second rotational speed of the engine at a second predetermined time increment;
   determining a second time value based upon the second rotational speed; and
   determining a weighted mean value of the first and second time values, and a weighted time value based thereon to control triggering of the solenoid valve.

2. The method as recited in claim 1, wherein the method further comprises the step of triggering the solenoid valve to start a flow of fuel to the engine based upon the weighted time value.

3. The method as recited in claim 1, wherein the method further comprises the step of triggering the solenoid valve to stop a flow of fuel to the engine based upon the weighted time value.

4. The method as recited in claim 1, wherein the first rotational speed is measured in a first time increment, and the second rotational speed is measured in a second time increment immediately following the first time increment.

5. The method as recited in claim 4, wherein the first and second time increments immediately precede the determination of the weighted time value.

6. The method as recited in claim 4, wherein the method further comprises the step of presetting an angular window after the second time increment by a computing-time angle, the angular window having a width corresponding to a width of each of the first and second time increments.

7. The method as recited in claim 6, wherein a weighing angle determines an interval between the angular window and a start of a flow of fuel to the engine.

8. The method as recited in claim 6, wherein the determination of the weighted time value is based substantially on the first time increment when a fuel delivery angle lies at the beginning of the angular window, and the determination of the weighted time value is based substantially on the second time increment when the fuel delivery angle lies at the end of the angular window.

9. The method as recited in claim 4, wherein the weighted time value is determined based on the following expression:

$$A = [(1/3°)*(AM-1)] + [(1-K/3°)*AM]$$

where A refers to the weighted time value, (AM+1) refers to the second time value, AM refers to the first time value, K refers to a weighing angle, and 3° is a width of each of the first and second time increments.

10. A device for controlling a solenoid-valve-controlled fuel-metering system for an internal combustion engine, comprising:
    means for measuring a first rotational speed of the engine during a first predetermined time increment;
    means for determining a first time value based upon the first rotational speed;
    means for measuring a second rotational speed of the engine during a second predetermined time increment;
    means for determining a second time value based upon the second rotational speed; and
    means for determining a weighted mean value of the first and second time values, and a weighted time value based thereon to control triggering of the solenoid valve.

11. The device as recited in claim 10, wherein the device further comprises means for triggering the solenoid valve to start a flow of fuel to the engine based upon the weighted time value.

12. The device as recited in claim 10, wherein the device further comprises means for triggering the solenoid valve to stop a flow of fuel to the engine based upon the weighted time value.

* * * * *

UNITED STATES PATENT AND TRADEMARK OFFICE
CERTIFICATE OF CORRECTION

PATENT NO. : 5,195,492

DATED : March 23, 1993

INVENTOR(S) : Gronenberg et al.

It is certified that error appears in the above-indentified patent and that said Letters Patent is hereby corrected as shown below:

Column 1      line 28, after "The" insert --end of injection occurs after the camshaft turns by a--.

Signed and Sealed this

Thirty-first Day of May, 1994

Attest:

BRUCE LEHMAN

Attesting Officer     Commissioner of Patents and Trademarks